United States Patent [19]

Ferro

[11] Patent Number: 4,964,936
[45] Date of Patent: Oct. 23, 1990

[54] METHOD OF MAKING FOAM-FILLED CELLULAR STRUCTURES

[75] Inventor: Gregory A. Ferro, Hoffman Estates, Ill.

[73] Assignee: Imi-Tech Corporation, Elk Grove Village, Ill.

[21] Appl. No.: 255,447

[22] Filed: Oct. 11, 1988

[51] Int. Cl.$^5$ .............................................. B29C 43/18
[52] U.S. Cl. ..................................... 156/242; 264/267; 264/321
[58] Field of Search ............... 428/117; 264/46.5, 46.6, 264/321, 267; 156/242

[56] References Cited

U.S. PATENT DOCUMENTS

| | | | |
|---|---|---|---|
| 2,744,042 | 5/1956 | Pace | 264/46.5 |
| 3,150,793 | 9/1964 | Messer | 264/46.5 |
| 3,549,468 | 12/1970 | Messineo et al. | 428/117 |
| 3,578,526 | 5/1971 | Harding | 156/242 |
| 3,630,813 | 12/1971 | Allen | 428/117 X |
| 3,650,871 | 3/1972 | Bentfors | 156/269 |
| 3,726,834 | 4/1973 | Acle, Jr. | 260/47 |
| 3,764,432 | 10/1973 | Bealor, Jr. | 156/242 |
| 3,775,526 | 11/1973 | Gilmore | 264/321 |
| 3,789,094 | 1/1974 | Hutchison | 264/46.5 |
| 3,886,023 | 5/1975 | Deplante | 156/253 |
| 3,956,050 | 5/1976 | Dow et al. | 156/242 |
| 4,045,267 | 8/1977 | Davis et al. | 156/197 |
| 4,054,477 | 10/1977 | Curran | 156/197 |
| 4,070,312 | 1/1978 | Gagliani et al. | 260/2.5 |
| 4,088,723 | 5/1978 | Norton | 264/46.6 |
| 4,135,019 | 1/1979 | Kourtides et al. | 428/117 |
| 4,193,829 | 3/1980 | Kourtides et al. | 156/276 |
| 4,251,579 | 2/1981 | Lee et al. | 428/73 |
| 4,265,688 | 5/1981 | Gorski | 156/73.1 |
| 4,284,443 | 8/1981 | Hilton | 156/242 |
| 4,299,872 | 11/1981 | Miguel et al. | 428/117 |

(List continued on next page.)

FOREIGN PATENT DOCUMENTS

| | | |
|---|---|---|
| 2258524 | 8/1975 | France . |
| 235611 | 1/1978 | France . |
| 211757 | 7/1984 | German Democratic Rep. . |
| 53-8666 | 1/1978 | Japan . |
| 54-13530 | 4/1979 | Japan . |
| 56-77302 | 6/1981 | Japan . |
| 57-135143 | 8/1982 | Japan . |
| 59-33135 | 2/1984 | Japan . |
| 59-31454 | 8/1984 | Japan . |
| 59-31455 | 8/1984 | Japan . |
| 60-72723 | 4/1985 | Japan . |
| 62-181133 | 8/1987 | Japan . |
| 1331266 | 9/1973 | United Kingdom . |
| 1387582 | 3/1975 | United Kingdom . |
| 1412926 | 11/1975 | United Kingdom . |
| 2174335 | 11/1986 | United Kingdom . |

OTHER PUBLICATIONS

Development of Fire-Resistant, Low Smoke Generating, Thermally Stable End Items for Aircraft & Spacecraft (NAS 9-15050, Jun., 1977, p. 24).

Development of Fire-Resistant, Low Smoke Generating, Thermally Stable End Items for Commercial Aircraft & Spacecraft Using a Basic Polyimide Resin (NAS9-15484, 12/77-4/80, pp. 129-130).

Gagliani, "Fire Resistant Resilient Foams", Final Report NAS 9-14718, Feb. 1986.

Primary Examiner—Jan H. Silbaugh
Assistant Examiner—Allan R. Kuhns
Attorney, Agent, or Firm—John F. Sieberth; Richard J. Hammond

[57] ABSTRACT

A non-flexible, non-resilient recurable cellular material, prepared by exposing cured polyimide foam to an atmosphere of steam at an elevated pressure, is introduced into a honeycomb or like structure so that the cells are at least partially filled with the recurable cellular material. The cellular material is then cured while contained within such cells to form a composite polyimide foam-containing structure. Laminates may be applied to either or both faces of the polyimide foam-containing cellular structure. These articles possess enhanced strength, yet are lightweight and flame resistant, and thus useful for structural, vibration damping and thermal insulation applications.

33 Claims, 2 Drawing Sheets

U.S. PATENT DOCUMENTS

| | | | |
|---|---|---|---|
| 4,319,000 | 3/1982 | Gagliani et al. | 521/189 |
| 4,330,494 | 5/1982 | Iwata et al. | 264/46.2 |
| 4,361,453 | 11/1982 | Gagliani et al. | 264/46.5 |
| 4,403,008 | 9/1983 | Factor | 428/117 |
| 4,409,054 | 10/1983 | Ryan | 156/293 |
| 4,433,068 | 2/1984 | Long et al. | 521/54 |
| 4,454,248 | 6/1984 | Pollock et al. | 264/51 |
| 4,546,047 | 10/1985 | Ryan | 428/565 |
| 4,562,112 | 12/1985 | Lee et al. | 428/318 |
| 4,564,547 | 1/1986 | Hughes | 428/117 |
| 4,576,862 | 3/1986 | Lee et al. | 428/317.7 |
| 4,639,343 | 1/1987 | Long et al. | 264/45.5 |
| 4,687,691 | 8/1987 | Kay | 428/117 |
| 4,708,972 | 11/1987 | Long et al. | 521/185 |
| 4,780,167 | 10/1988 | Hill | 264/37 |

METHOD OF MAKING FOAM-FILLED CELLULAR STRUCTURES

TECHNICAL FIELD

This invention relates to cellular structures (e.g., honeycomb) filled with polyimide foam, to methods for the production of such filled structures, and to uses of such filled structures, such as in sandwich panels and the like.

BACKGROUND

The concept of filling the cells of honeycomb with various substances is well-known. Among the materials used as fillers are inorganic aggregate particles coated with foaming phenol resin (Jap. Kokai No. 62-181,133); low-density phenolic resin foam (Brit. No. 2,174,335); foam comprising phenol resin and epoxy or polyurethane resin (Jap. Kokai No. 60-72723); finely divided insulating material, e.g., microporous material such as silica gel, volatized $SiO_2$, $CaSiO_3$, vermiculite, perlite, alumina or titania (U.S. Pat. No. 4,564,547); incombustible filler having a density below 0.2 kg/cu.dm. (E. Ger. No. 211,757), foamed or foamable inorganic grains (Jap. Kokoku 84-31455); urethane foam (Jap. Kokai No. 59-33135); powdered brazing metal and abradable material both mixed with a binder and plasticizer (U.S. Pat. No. 4,546,047 and 4,409,054); cement (U.S. Pat. No. 4,403,008); foamed urea resin (Jap. Kokai No. 57-135143), intumescent insulating material, e.g., epoxy or vinyl or silicone resin, sodium silicate, silicone rubber, butyl rubber, magnesium oxide or magnesium chloride preferably together with various fillers (U.S. 4,299,872); sintered metal powder paste (Jap. Kokai No. 56-77302); thermoplastics (U.S. Pat. No. 4,265,688); carbon microballoons (U.S. Pat. No. 4,193,829 and U.S. Pat. No. 4,135,019); foamed resin (U.S. Pat. No. 4,330,494); curable slurries of inorganic materials (Jap. Kokai No. 54-13530); cellular material (Fr. No. 2,356,511); filler coated foam resin liquid (Jap. Kokai 53-8666); foamable inorganic material (Jap. Kokoku No. 84-31454); fire-extinguishing agents of liquid, gaseous or powdery type (U.S. Pat. No. 4,251.579); foam material (U.S. Pat. No. 4,054,477); foam resin (U.S. Pat. No. 4,045,267); silicone resin (U.S. Pat. No. 3,956,050); porous nickel-aluminum alloy (Fr. No. 2,258,524); granular or pelleted non-combustible carrier material coated with an intumescent fire resisting paint or compound (Brit. No. 1,387,582); fibers (Brit. No. 1,412,926); thixotropic material, e.g., a mixture of liquid synthetic resin and finely powdered silicon oxide (U.S. Pat. No. 3,886,023); foamed polystyrene granules (U.S. Pat. No. 3,650,871); polybenzimidazole resin mixed with aluminum powder, glass fibers colloidal silica or hollow glass microspheres (U.S. Pat. No. 3,549,468); and so on. Some additional prior efforts associated with filling the cells of cellular structures such as honeycomb with foams or fibrous materials are referred to, for example, in U.S. Pat. Nos. 3,578,526; 3,630,813; 3,733,229; and British No. 1,331,266.

In a NASA report entitled Development of Fire-Resistant U.S. Pat. No. Low Smoke Generating. Thermally Stable End Items for Aircraft and Spacecraft (NAS9-15050, June, 1977, page 24) a method for filling honeycomb cells with polyimide foam is described. In this method the honeycomb panel was first dipped into a polyimide precursor resin solution several times to fully coat the cell surface area. The panel was then dried in a vertical position to allow excess resin to collect in the bottom of the cells. Drying was conducted in a circulating air oven for 14 to 16 hours at 82-93C. The panels were then foamed at 287.7-316° C. for 15 to 30 minutes and during the heating the resin foamed up to completely fill the cells. The panel was then surface finished to provide a level plane between the foam and honeycomb for receiving panel skins to be bonded thereon. In a subsequent report entitled Development of Fire-Resistant, Low Smoke Generating, Thermally Stable End Items for Commercial Aircraft and Spacecraft Using a Basic Polyimide Resin (NAS9-15484, covering work in the period of December 1977 to April 1980, pages 129-130) the same general method was used and optimized and involved dipping, drying, foaming, curing, and trimming excess foam to flush with the panel surface. This same report describes a modification of this process in which the polyimide precursor resin solution was spray coated onto a preheated honeycomb thereby eliminating the need for the drying step.

SUMMARY OF THE INVENTION

This invention provides a new type of composite based on polyimide foam which possesses enhanced strength, yet is lightweight and flame resistant, and thus is useful for structural, vibration damping and thermal insulation applications These composites make effective use of the strength and lightweight characteristics of open-celled structural materials, such as honeycomb, and the combination of desirable properties of cured polyimide foams, such as low density, flame resistance, sound and vibration damping characteristics, thermal insulative qualities, and desirable low temperature properties. In order to produce such composites it was necessary to discover a way of insuring that all cells of the honeycomb or cellular structure receive a suitable quantity of polyimide foam and of insuring that the foam will be well-bonded to the adjacent cell walls of the cellular structure.

This invention thus involves, inter alia, the discovery of a novel method for filling the cells of cellular structures with polyimide foam. The method makes it possible produce the filled structures without applying the precursor by dipping or spraying and foaming the material in situ followed by trimming or by crushing preformed foam into the cells. By virtue of this invention new and highly useful lightweight, flame resistant composite structures can be readily produced, and such composite structures and their production constitute additional embodiments of this invention.

As described in U.S. Pat. No. 4,883,827 it has been discovered that by exposing cured polyimide foam to an atmosphere of steam under appropriate time-temperature-pressure conditions a non-flexible, non-resilient recurable cellular material is formed.

In accordance with this invention such preformed foamy material curable to a polyimide foam is introduced into the open cells of the honeycomb or like cellular structure and cured therein by the application of thermal energy.

Thus, in conducting the cell-filling operation, a preformed body of cured polyimide foam is used. This body is first converted into a body of non-flexible, non-resilient recurable cellular material in which the cellular structure of the initial foam remains substantially intact. When in this form, the cellular material is easily forced into the cells of a cellular structure for example by pressing the honeycomb or like cellular structure into the cellular material, or vice versa. The resultant filled structure is then heated to effect curing of the cellular material within the cells of the honeycomb or the like. When producing laminates or sandwich composites, this heating step may be conducted before, during or after the application of the laminating materials used in covering one or both ends of the filled cells of the core or substrate of the laminated or sandwich composite sheet or panel.

Accordingly, in one of its embodiments this invention provides a process which comprises converting cured polyimide foam into a non-flexible, non-resilient recurable cellular material by exposing the foam to the action of pressurized steam, impressing into the cellular material a structure having a plurality of laterally disposed open cells therein to at least partially fill such open cells with the non-flexible, non-resilient recurable cellular material, and heating the structure and contained cellular material to cause such material to cure.

In another of its embodiments this invention provides a process which comprises (i) introducing a non-flexible, non-resilient recurable cellular material, prepared by exposing cured polyimide foam to an atmosphere of steam at an elevated pressure, into a structure having a plurality of walls defining a plurality of laterally disposed open cells so that such open cells are at least partially filled with such recurable cellular material, and (ii) curing the cellular material while contained within such cells to form a composite polyimide foam-containing structure. A preferred process of this type comprises (i) impressing into a non-flexible, non-resilient recurable impressible cellular material, prepared by exposing cured polyimide foam to an atmosphere of steam at an elevated pressure, a structure having a plurality of walls defining a plurality of laterally disposed open cells so that such open cells are at least partially filled with such recurable cellular material, and (ii) heating the recurable cellular material to cause it to cure while contained within such cells to form a composite polyimide foam-containing structure.

The cellular structures used in these operations are preferably honeycomb structures because of their strength characteristics and commercial availability, although a variety of other types of cellular structures can be employed.

Still other embodiments of this invention include:

(a) A composite article comprising a structure having a plurality of laterally disposed interconnected walls defining a plurality of open-ended cells therein (e.g., a honeycomb), said cells being at least partially filled with cured polyimide foam.

(b) A composite article comprising (i) a structure having a plurality of laterally disposed interconnected walls defining a plurality of open-ended cells therein, (ii) cured polyimide foam disposed within said cells and bonded to the walls thereof, and (iii) a laminate affixed to at least one end of the interconnected walls and covering the proximate ends of the foam-containing cells.

(c) A composite article comprising (i) a structure having a plurality of laterally disposed interconnected walls defining a plurality of open-ended cells therein, (ii) cured polyimide foam disposed within said cells and bonded to the walls thereof, (iii) a laminate affixed to at least one end of the walls and covering the proximate ends of the foam-containing cells, and (iv) a laminate affixed to the other end of the interconnected walls and covering the proximate ends of the foam-containing cells.

These and other embodiments of this invention will become still further apparent from the ensuing description, appended claims, and accompanying drawings.

Figure 1:
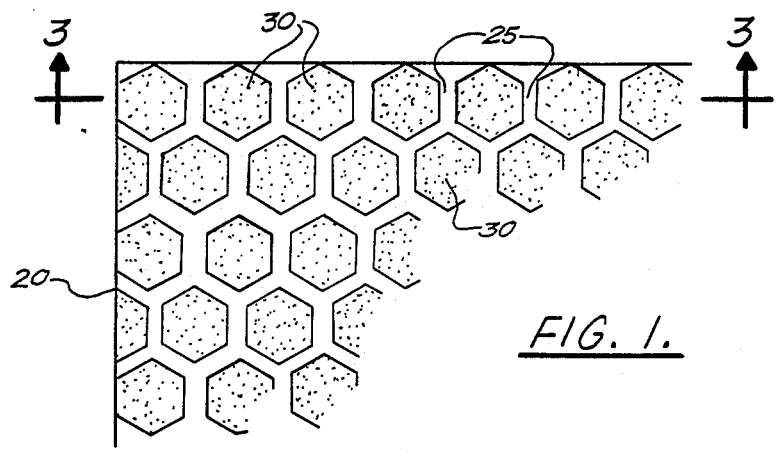
FIG. 1 depicts in fragmentary plan view a foam-filled honeycomb structure of this invention.

Further Description of the Invention I. Formation of the Non-Flexible Non-Resilient Recurable Cellular Material In producing this recurable material, a cured polyimide foam is converted by a hydrolytic steaming process under controlled temperature-pressure conditions into a recurable material which is malleable and pliable and easily cut or shaped. Yet it retains most of its original geometric configuration and cellular structure. It is introduced into the cells of a cellular structure such as a honeycomb, while in its malleable, pliable, easily cut form. On heating the resultant foam-filled cellular structure to a suitable temperature the recurable foam returns to a cured state within the honeycomb or like cellular structure.

The conditions used in the steam treatment are preferably such as to yield a recurable material that on recuring possesses at least tensile properties comparable to those of the original cured foam. However for some applications the recurable foamy material need not have this characteristic—it may be a material that is recurable to a cured foam having lower tensile properties than the initial cured foam.

In many cases a convenient way of gauging the extent of the pressurized steam hydrolysis of the initial polyimide foam is to monitor the progress of this reaction by means of differential scanning calorimetry. For example, as the pressured steaming operation is being conducted, samples of the foam may be examined by means of a differential scanning calorimeter such as a Mettler TA-3000 System with a TC 10A Processor.

In general, the non-resilient, non-flexible foam formed in the steam treatment will, at least when using foams of the type described in the Examples hereinafter, have a consistency somewhat like lightly packed snow.

In conducting the pressurized steam hydrolysis, it is convenient to subject the initial polyimide foam to the action of steam in a closed system such as an autoclave. The time-temperature-pressure conditions may vary from one type of foamed polyimide polymer to another. With polyimide foams of the type described in the Examples hereinafter, temperatures in the range of about 260 to about 274° C. (pressures in the range of about 680 to about 849) psia will be employed. The time periods used will of course depend on the temperature and pressure used, and the properties desired in the resultant non-flexible, non-resilient foamed material to be produced therefrom. Thus for a given cured polyimide foam, the higher the temperature and pressure, the shorter may be the steam treatment time. And, if it is desired to produce a non-flexible, non-resilient foamed material that can be cured to a polyimide foam having tensile strength properties comparable to those of the initial foam, the time of exposure to a given set of steam temperature-pressure conditions will be shorter than if it is desired to form a recurable non-flexible, non-resilient foamed material that can be recured to a polyimide foam which does not have tensile strength properties generally as good as those of the initial cured polyimide foam.

If desired, the steam to which the initial cured polyimide foam is exposed may be diluted with other gaseous or vaporous materials, such as air, nitrogen, argon, neon, methanol, or the like.

II. Formation of the Foam-Filled Cellular Structures

Figure 2:
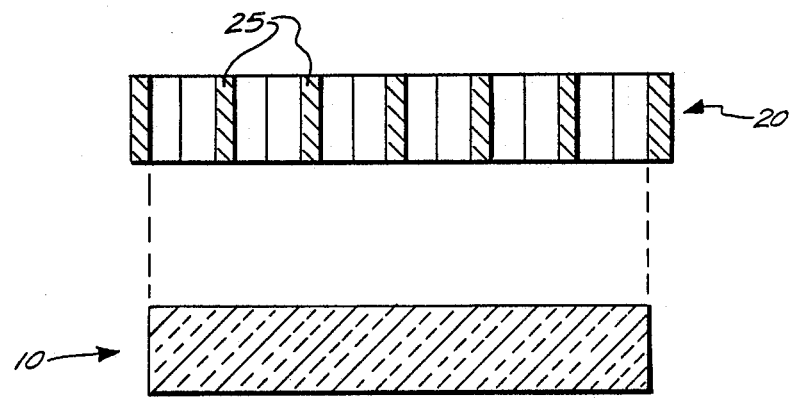
FIG. 2 illustrates in sectional elevation a method by which foam-filled cellular structures of this invention may be produced pursuant to this invention.
Figure 3:
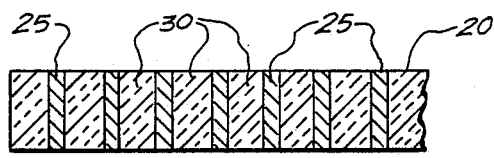
FIG. 3 illustrates in sectional elevation taken along line 3,3 of FIG. 1 but on a smaller scale, a foam-filled cellular structure of this invention.

Referring now to the Drawings, FIG. 2 illustrates one preferred way by which the non-flexible, non-resilient recurable cellular material may be introduced into the cells of a honeycomb or other cellular structure. In this operation a body 10 (e.g., a slab) of recurable cellular material and an open cellular structure 20 such as a honeycomb are aligned with each other and brought together so that structure 20 is impressed into body 10. The precise way in which this is accomplished is not critical and various ways may be used, such as by pressing structure 20 into stationary body 10, or body 10 into stationary structure 20, or by concurrently moving body 10 and structure 20 against each other. In any case the cells of structure 20 become filled with the recurable cellular material of body 10 to whatever depth may be desired. Thereupon the resultant foam-filled structure is heated to a curing temperature, for example in an oven. As indicated in FIGS. 1 and 3, this results in the formation in the cells of structure 20 of a plurality of plugs 30 of cured polyimide adhering to the adjacent walls 25 of the structure.

Figure 5:
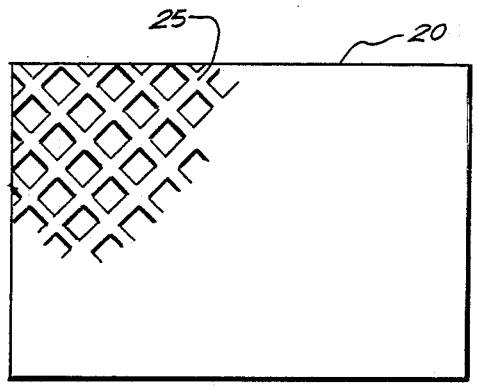
FIG. 5 depicts in fragmentary plan view an alternative form of cellular structure that may be used in forming the foam-filled articles of this invention.
Figure 6:
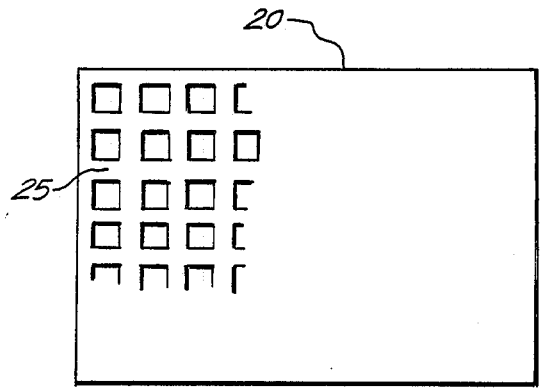
FIG. 6 depicts in fragmentary plan view another alternative form of cellular structure that may be used in forming the foam-filled articles of this invention.
Figure 7:
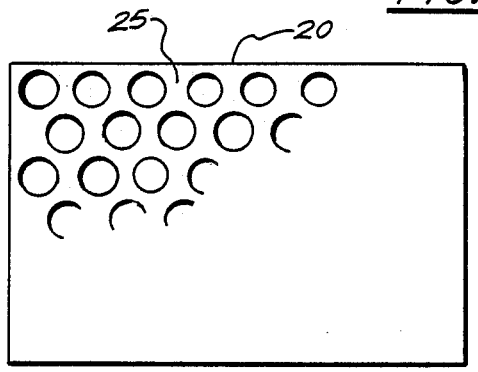
FIG. 7 depicts in fragmentary plan view yet another alternative form of cellular structure that may be used in forming the foam-filled articles of this invention.

FIGS. 5, 6 and 7 indicate that the configuration of cell arrangement of structure 20 can vary widely. For example in FIG. 5 the interior walls of structure 20 define a diamond shaped pattern of cells. In FIG. 6, structure 20 has a rectangular or square pattern of cells whereas in FIG. 7 a pattern of adjacent offset circular cells is defined by the interior walls of structure 20. Other configurations for the cells are possible and permissible.

The materials from which the cellular structure 20 itself may be formed can be widely varied to suit the needs of the occasion. Thus structure 20 may be composed of metals, polymers and plastics (e.g., polyimide, fluoropolymers such as TEFLON polymer, polybenzimidazole, polypropylene, etc.), resin coated or impregnated paper or cardboard, fiber composites, and the like. The size of the individual cells can range from large to small—this is primarily a matter of choice to be governed by such factors as intended use of the resultant product, cost, and availability of materials.

While it is preferable to introduce the non-flexible, non-resilient recurable cellular material into the cellular structure by procedures such as described above, other methods may be used. For example the recurable pasty foamy material may be introduced into the cells of the cellular structure by means of a spatula, or other suitable extrusion device, or the like if care is exercised not to excessively destroy the structure of the recurable foam.

III. Formation of Foam-Filled Laminates and Sandwich Structures

Figure 4:
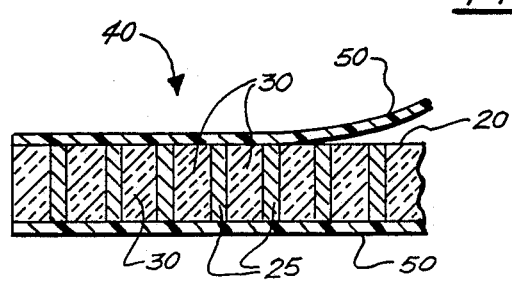
FIG. 4 illustrates in sectional elevation a foam-filled cellular structure of this invention laminated on both sides (i.e., on both ends of the laterally disposed cells of the cellular structure).

As indicated by FIG. 4, a foam-filled laminated structure 40 may be formed by applying a suitable laminating material 50 over the ends of the foam-filled structure 20 to cover some if not all of the filled cells. Laminating material 50 may be applied to both sides of foam-filled structure 20 (as indicated in FIG. 4) or it may be applied to just one side, if desired.

A wide selection of laminating materials are available for such use, and include sheets, plies, boards, films, foils or other suitable generally flat forms of metal, plastics, fiberreinforced composite materials, reinforced ceramic composites, resin-coated fibrous materials, paper or paperboard, particle board, rubbers and elastomers, and many other similar materials. Laminating material 50 may be applied before, during or after the curing operation. Suitable adhesives may be used in order to secure or assist in securing laminating material 50 to the ends of the foam-filled cells of structure 20. In some cases an adhesive may not be necessary, as when the laminating material 50 is applied tightly against the ends of plugs 30 before curing is effected whereby the cured polyimide serves as an adhesive. However ordinarily it is convenient and desirable to employ an adhesive to insure tight bonding between the parts. The types and identities of adhesives suitable for this use are so well known to those skilled in the art as to require no further explanation. See for example Kirk-Othmer, Encyclopedia of Chemical Technology, Copyright 1978 by John Wiley & Sons, Inc., Wiley-Interscience, Third Edition, Volume 1, pages 488-510 and references cited therein; and Encyclopedia of Polymer Science and Technology, Copyright 1964 by John Wiley & Sons, Inc., Interscience, Volume 1, pages 445-550 and references cited therein.

Laminating material 50 may also be in the form of tapes having adhesive on either or both sides. The composition of the tape and adhesive will of course be dependent on the use for which the resultant foam-filled composite article is intended, and a wide variety of commercially-available tapes are suitable for making such composite articles. Some of these materials are described, for example, in product brochures such as "Scotch 3M Industrial Tapes and Related Products" (No. 70-0701-06748(151) DPI) and "Scotch 3M Specialty Tapes and Related Products" (No. 70-0701-5000-1), (both available from the 3M Company) or equivalent brochures, and "temp-r-tape/electrical-mechanical" (No. TRT-4-2/83), or equivalent brochure (available from CHR Industries, Inc.).

It will of course be recognized that multilayered structures or panels may be used as laminating material 50. The possibilities are thus virtually limitless.

Having described the basic concepts of the invention, reference is now made to the following examples which are provided by way of illustration, but not by way of limitation of the practice of the invention.

Examples I through III illustrate methods of forming the non-flexible, non-resilient recurable cellular material, and also illustrate how such material may be cured.

EXAMPLE I

The samples used in these runs were based on cured polyimide foams made from a lower alkyl ester of benzophenone tetracarboxylic acid (predominantly dimethyl ester), 4,4'-methylenedianiline and 2,6-diaminopyridine in a mol ratio of about 1.0:0.7:0.3, respectively. Six such samples were placed in a sealed autoclave and subjected to steam at 270° F. (about 132° C.) for 4 hours. After each hour, the glass transition temperature (Tg) of the foam was determined by differential scanning calorimetry with a Mettler TA-3000 System with a TC 10A Processor, using the 50% Tg values reported by the system. After the third hour, and again at the end of the fourth hour, separate portions of these six foams were removed from the autoclave and recured in a thermal oven at 525° F. (about 274° C.) for 45 minutes. The tensile properties of the resultant cured foams were then determined by ASTM test procedure D-3574 using an Instrom model 1122 universal tester with a 50-pound load cell.

Table 1 shows the Tg values for the initial polyimide foam samples, the Tg values of these materials after 1, 2, 3, and 4 hours of exposure to the pressurized steam, and the Tg values of the foams that were recured after 3 and 4 hours of steam exposure, respectively. The results of the tensile strength measurements are shown in Table 2.

TABLE 1

| | Glass Transition Temperatures, °C. | | | | |
|---|---|---|---|---|---|
| Sample | Before Autoclave | Autoclave 1 Hour | Autoclave 2 Hours | Autoclave 3 Hours | Autoclave 4 Hours |
| 1 | 268.9 | 264.0 | 260.9 | 258.8 | 260.1 |
| 2 | 273.4 | 267.5 | 262.8 | 262.4 | 256.2 |
| 3 | 273.0 | 265.2 | 261.7 | 260.6 | 260.1 |
| 4 | 270.2 | 268.4 | 268.1 | 262.2 | 260.0 |
| 5 | 269.3 | 265.4 | 265.3 | 265.0 | 253.7 |
| 6 | 272.8 | 266.6 | 263.4 | 262.9 | 255.3 |
| | | | | Recured | Recured |
| 1 | | | | 286.7 | 286.3 |
| 2 | | | | 286.1 | 283.6 |
| 3 | | | | 286.5 | 285.5 |
| 4 | | | | 286.3 | 285.6 |
| 5 | | | | 284.9 | 287.4 |
| 6 | | | | 286.7 | 284.9 |

TABLE 2

| | Tensile Strength, (psi) | |
|---|---|---|
| Sample | Recured After 3 Hours Autoclave | Recured After 4 Hours Autoclave |
| 1 | 11.7 | 8.4 |
| 2 | 11.7 | 11.5 |
| 3 | 12.3 | 10.4 |
| 4 | 12.1 | <1.0 |
| 5 | 12.6 | 7.7 |
| 6 | 11.5 | <1.0 |

The data in Table 2 indicate that under the conditions used, all six recured samples that had been steam treated for 3 hours exhibited tensile strength properties similar to the tensile strength properties of the original cured polyimide foams. On the other hand, although all of the six samples that had been steamed treated for 4 hours were recurable, only recured Samples 2 and 3 retained tensile properties similar to the initial foams from which they were formed. Recured Samples 1 and 5 had lower tensile strengths and the tensile strengths of Samples 4 and 6 were very low.

EXAMPLE II

A series of runs were conducted generally as in Example I except that the samples were exposed to pressurized steam in the autoclave for a total of 6 hours, and tensile strength measurements were made on all samples. The initial cured polyimide foam had a Tg of 275.36° C. and a tensile strength of 9.08+0.40 psi. When this foam was subjected to the recuring conditions (without having been exposed to steam) it had a Tg of 280.43° C. and a tensile strength of 8.91+1.07 psi. The results of the runs involving use of the steam treatment are summarized in Table 3.

TABLE 3

| | Glass Transition Temperatures, °C. | | | Tensile Strength, psi | |
|---|---|---|---|---|---|
| Sample | Initial | After Autoclave | After Recuring | After Autoclave | After Recuring |
| 1 Hr. | 275.19 | 271.95 | 284.80 | 9.84 + 1.66 | 10.16 + 1.55 |
| 2 Hrs. | 276.33 | 268.24 | 280.74 | 7.26 + 1.35 | 8.88 + 0.64 |
| 3 Hrs. | 274.92 | 265.20 | 277.81 | 6.13 + 1.02 | 7.23 + 0.61 |
| 4 Hrs. | 274.15 | 261.86 | 280.36 | <1.0 | 9.15 + 0.55 |
| 5 Hrs. | 279.40 | 263.27 | 281.29 | <1.0 | 11.09 + 0.80 |
| 6 Hrs. | 276.04 | 273.66 | 286.46 | <1.0 | <1.0 |

EXAMPLE III

Using the general procedure of Example II, six samples (12"×6"×0.5" in size) of the cured polyimide foam were subjected to pressurized steam in the autoclave. After specified times of steam-treatment, the samples together with a control sample (not steam treated) were subjected to recuring conditions, and Tg and tensile strength measures were made on all samples. Tables 4 and 5 summarize the results so obtained.

TABLE 4

| | Glass Transition Temperatures, °C. | | | | | | |
|---|---|---|---|---|---|---|---|
| | Before Autoclave | 1 Hr. | 2 Hrs. | 3 Hrs. | 4 Hrs. | 5 Hrs. | 6 Hrs. |
| | | | | After Autoclave | | | |
| Control | 275.4 | | | | | | |
| 1 | 275.2 | 271.9 | | | | | |
| 2 | 276.3 | | 268.2 | | | | |
| 3 | 274.9 | | | 265.2 | | | |
| 4 | 274.2 | | | | 261.9 | | |
| 5 | 279.4 | | | | | 263.3 | |
| 6 | 276.0 | | | | | | 273.7 |

TABLE 4-continued

| | Glass Transition Temperatures, °C. | | | | | | |
|---|---|---|---|---|---|---|---|
| | Before Autoclave | 1 Hr. | 2 Hrs. | 3 Hrs. | 4 Hrs. | 5 Hrs. | 6 Hrs. |
| | | After Thermal Recure | | | | | |
| Control | 280.4 | | | | | | |
| 1 | | 284.8 | | | | | |
| 2 | | | 280.7 | | | | |
| 3 | | | | 277.8 | | | |
| 4 | | | | | 280.4 | | |
| 5 | | | | | | 281.3 | |
| 6 | | | | | | | 286.5 |

TABLE 5

| | Tensile Strength, (psi) | | | | | | |
|---|---|---|---|---|---|---|---|
| Sample | Before Autoclace | 1 Hr. | 2 Hrs. | 3 Hrs. | 4 Hrs. | 5 Hrs. | 6 Hrs. |
| | | After Autoclave | | | | | |
| Control | 9.1 | | | | | | |
| 1 | | 9.8 | | | | | |
| 2 | | | 7.3 | | | | |
| 3 | | | | 6.2 | | | |
| 4 | | | | | <1.0 | | |
| 5 | | | | | | <1.0 | |
| 6 | | | | | | | <1.0 |
| | | After Thermal Recuring | | | | | |
| Control | 9.0 | | | | | | |
| 1 | | 10.2 | | | | | |
| 2 | | | 8.9 | | | | |
| 3 | | | | 7.2 | | | |
| 4 | | | | | 9.2 | | |
| 5 | | | | | | 11.1 | |
| 6 | | | | | | | <1.0 |

Examples IV and V illustrate the production and properties of laminated foam-filled cellular structures of this invention.

EXAMPLE IV

A slab of cured polyimide foam of the type described in Example I was treated with steam in an autoclave at about 132° C. for 4 hours. A commercially-available honeycomb approximately 0.36 inch in thickness made from paperboard coated with a phenolic resin was impressed into the resultant slab of recurable non-flexible, non-resilient recurable cellular material to fill the cells of the honeycomb therewith. The major axis (apex to opposite apex) across the individual honeycomb cells was about 0.15 inch and the minor axis (sidewall to opposite sidewall) was about 0.10 inch. The foam-filled structure was heated in a thermal oven for 40 to 45 minutes at about 274° C. to recure the foam into polyimide foam within the cells of the honeycomb. The resultant structure was then laminated on both sides (over the ends of the filled cells) with a polyimide tape having a silicone adhesive (CHR Product No. K105, of CHR Industries, Inc., New Haven, CT). The finished composite had a density of 9.62 pounds per cubic foot and an areal density of 0.32 pound per square foot. It exhibited a burn-through time through its 0.37 inch thickness of 44 seconds when exposed to a propane torch with a flame temperature of 1960° F. (about 1071° C.).

EXAMPLE V

Using the same general procedure as in Example IV, a composite laminated on one side only was produced from a phenolic resin coated paperboard honeycomb (thickness: 1 inch; major axis: ca. 0.23 inch; minor axis: ca. 0.2 inch). The laminate was formed from a glass cloth tape, 7 mils in total thickness (Scotch brand industrial tape No. 361, of 3M Company). The cured flame-resistant laminate had a density of 4.2 pounds per cubic foot and an areal density of 0.35 pound per square foot.

Examples VI and VII illustrate the formation of foamfilled cellular structures of this invention, which may be used as is or subsequently laminated on either or both sides.

EXAMPLE VI

Two slabs of a cured polyimide foam composed predominantly of polyimide made from benzophenone tetracarboxylic acid dimethyl ester reacted with an essentially equimolar amount of a mixture of (4,4'-methylenedianiline, 2,6-diaminopyridine and a small proportion of primary amino-terminated butadiene-acrylonitrile nitrile copolymer (see U.S. Pat. No. 4,539,342) were steam treated in an autoclave for 5 hours. The changes in Tg of the two slabs before and after this treatment were: Slab A, 270° C. to 264° C.; Slab B, 273° C. to 265° C. The so-treated foams were non-flexible and non-resilient in character. Each of these slabs was pressed into a resin coated paperboard honeycomb and the resultant filled honeycomb structures subjected to curing at 260° C. for one hour. The recured polyimide filled honeycombs exhibited excellent integrity-the polyimide foam was well-bonded to the interior honeycomb structure and all cells were substantially filled with the polyimide foam. After such curing the T of the polyimide foam in the composite articles was: Foam in article from Slab A: 278° C; Foam in article from Slab B:283 °.

EXAMPLE VII

A slab of cured polyimide foam made by reaction between substantially equimolar amounts of benzophenone tetracarboxylic acid dimethyl ester and a mixture composed of 50 mol percent of 4,4'-methylenedianiline, 30 mol percent 2,6-diaminopyridine and 20 mol percent of 1,6-diaminohexane was treated with steam in an autoclave for 2.15 hours. At the end of this time, the foam was non-resilient, non-flexible, deformable and readily penetratable. While in this condition, it was used to fill a resin-coated paperboard honeycomb and the resultant composite was subjected to thermal curing for two hours at 260° C. It the end of this time the foam filled composite was cooled to room temperature. It was found that the foam tightly adhered to the honeycomb structure and that the cells thereof were substantially completely filled with a uniform polyimide foam.

IV. Formation of the Initial Polyimide Foams

The initial cured polyimide foams used in the practice of this invention can vary widely in composition. In general, they are produced from polyimide precursors composed of a mixture comprising at least (i) one or more organic tetracarboxylic acids or derivatives thereof, and (ii) one or more organic diamines co-reactive therewith, preferably including at least an aromatic or heterocyclic primary diamine. Components (i) and (ii) are usually present in the mixture in essentially stoichiometric quantities.

The organic tetracarboxylic acids or derivatives thereof are preferably based on aromatic tetracarboxylic acids having the general formula:

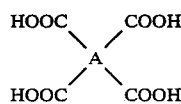

wherein A is a tetravalent organic group preferably an aromatic group. The tetravalent organic group A is most preferably an aromatic group having one of the following structures:

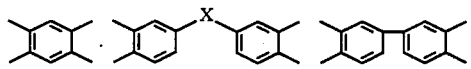

wherein X is one or more of the following:

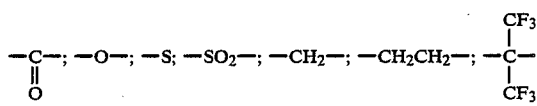

although other aromatic groups are suitable. The derivatives which may be employed include acid halides, anhydrides, esters and the like. Of these, esters are preferred and are most generally used for foam production.

Preferred among the tetracarboxylic acid esters are the alkyl esters of 3,3',4,4'-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S.Pat. No. 4,161,477, 4,183,838 and 4,183,839, the disclosures of which are incorporated herein by reference. As described in those patents, bisimide is formed by reaction of a tetracarboxylic acid dianhydride with an oxoimine such as caprolactam and then reacted with the diamine of diamines to produce the desired polyimides. The caprolactam is displaced during the reaction, in much the same way as is the ester portion of the tetracarboxylic acid ester.

The tetracarboxylic acid derivative used in the manufacture of the initial polyimide foams employed in the practice of this invention may also be an N-substituted imido acid ester of the tetracarboxylic acid as taught by U.S. Pat. No. 4,647,597 and 4,656,198, the disclosures of which are incorporated herein by reference. As described in those patents, the N-substituted imido acid ester may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula: wherein R' is an aromatic group containing 5 to 16 carbon atoms and containing up to one hetero atom in the ring, the hetero atom being nitrogen, oxygen or sulfur. Also included are aromatic groups such as:

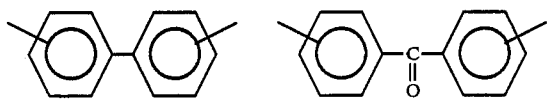

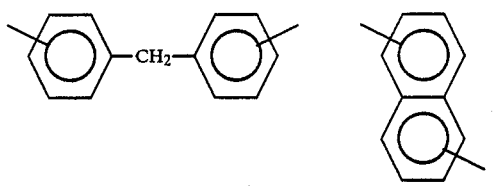

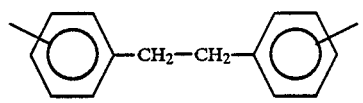

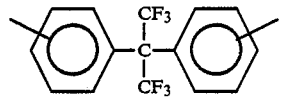

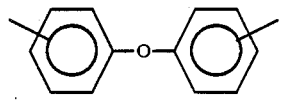

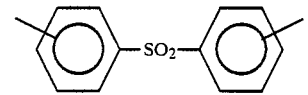

Representative of such diamines include:

2,6-diaminopyridine;
3,5-diaminopyridine;

3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6'-diamino toluene;
2,4'-diamino toluene; and the like.

It is also possible and sometimes desirable in the preparation of the polyimide precursors, to include in the reaction mixture one or more aliphatic diamines. Such aliphatic diamines are preferably alpha-omega diaminoalkanes having the formula:

$$H_2N-(CH_2)_n-NH_2 \quad (I)$$

wherein n is an integer from 2 to 16. Representatives of such diamines include 1,3-diaminopropane, 1,4-diaminobutane, 1,5-Idiaminopentane, 1,6-diaminohexane, etc.

In place of or in addition to the foregoing aliphatic amines, use can be made of aliphatic etherified polyamines of the type polyoxypropylene amines having the formula:

$$H_2N-CH(CH_3)CH_2-[OCH_2CH(CH_3)]_x-NH_2 \quad (II)$$

wherein x varies from 1 to about 5 carbon atoms.

Other useful primary diamines which may be included in the foams used in the practice of this invention include aminoterminated butadiene-nitrile copolymers having the general formula:

$$H_2N-R-[(CH_2-CH=CH-CH_2)_x(CH-CH)_y]_n-R-NH_2 \quad (III)$$
$$\quad\quad\quad\quad\quad\quad\quad\quad\quad\quad\quad\quad | \quad\quad\quad\quad\quad\quad\quad\quad\quad\quad\quad\quad R_1$$
$$\quad\quad\quad\quad\quad\quad\quad\quad\quad\quad\quad\quad CN$$

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamines which may be included in the polyimide foams used in this invention is the aromatic amino-terminated silicones, such as those having the general formula:

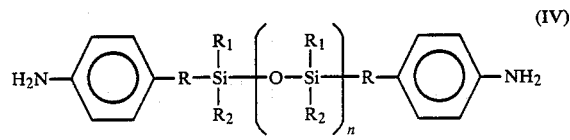

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams for use in this invention are the diesters of an amino-substituted aromatic carboxylic acid and a polymethylene glycol. Such diesters may be represented by the general formula:

$$H_2N-ArCOO-R-OOCAr-NH_2 \quad (V)$$

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoic acid.

In producing the initial polyimide foams, the organic tetracarboxylic acid preferably in the form of its diester, most preferably from methanol or ethanol, is reacted with the above-referred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the polyimide and polymers can be varied. In general, it is preferred to employ essentially stoichiometric proportions as between the mixture of tetracarboxylic acids or derivatives thereof and the primary diamine(s). However, non-stoichiometric mixtures can be used although the excess of the reactant present in excess usually does not participate in the reaction.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen TO, Celogen AZ 130, Celogen RA, Celogen HT 500, Celogen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than microns in diameter.

The chemical compositions of the blowing agents identified by trade name above follow:

| Blowing Agent | Chemical Composition |
| --- | --- |
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD valuse. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in forming polyimide foams suitable for use in the practice of this invention.

The initial foams may contain various filler and/or reinforcing materials. For example, graphite, glass and other synthetic fibers can be added to the precursor composition to produce a fiber-reinforced product. Microballons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

When producing foams from tetracarboxylic acids or derivatives thereof other than lower alkyl esters, a blowing agent and/or microballons should be employed in order to achieve a suitable cellular structure.

Although not necessary, for some applications it is desirable that the initial foam contain a suitable quantity of a flame retardant material in order to still further increase the flame resistance of the foam.

In preparing the polyimide precursors, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 MHz, with the power output ranging from 1 to 100 kw. The power output to prepolymer weight ratio generally falls within the range of 0.1 to 10 kw per kg.

The specific details concerning the production of polyimide foams have been extensively described in the literature and foams suitable for use in the practice of this invention are available as articles of commerce (SOLIMIDE ® Foam). In practicing this invention, all that is required is that the initial cured polyimide foam be convertible to a non-flexible, non-resilient recurable cellular material when subjected to steam treatment under appropriate conditions of time, temperature and pressure.

V. Uses of Foam-Filled Cellular Structures and Laminated or Sandwich Structures The flame and fire resistance of the foams of the foam-filled cellular structures of this invention together with their relatively low smoke output when exposed to fire render the foam-filled structures ideally suited for use as construction and/or insulation materials for aircraft and spacecraft, houses and buildings of all types, automobiles and trucks, boats and ships, submarines, furniture, and the like. The foam-filled laminated and sandwich structures are particularly useful as structural members (e.g., flooring, wall panels, etc.) especially when the honeycomb or other cellular structure and the laminate(s) used are themselves composed of flame resistant or non-combustible material(s). Enhancing all such utilities are the relatively low densities and high strengths in which the foam-filled structures of this invention may be provided. The cured foams within the cellular structures also serve to dampen sound and other types of vibration.

It will be apparent that this invention is susceptible to considerable variation in the practice without departing from the spirit and scope of the appended claims, the forms described hereinbefore being merely exemplary of its practice.

What is claimed is:

1. A process of forming a composite polyimide foam-containing article which comprises:
   (i) exposing cured polyimide foam to an atmosphere of steam at an elevated pressure so that said foam is converted into a body of non-flexible, non-resilient, recurable cellular material;
   (ii) pressing said body of non-flexible, non-resilient, recurable cellular material into a structure having a plurality of walls defining a plurality of laterally spaced open cells so that said open cells are at least partially filled with said recurable cellular material; and
   (iii) heating said recurable cellular material to cause it to cure while contained within said structure to form said composite polyimide foam-containing article.

2. A process according to claim 1 wherein the structure used in step (ii) is a honeycomb structure.

3. A process according to claim 1 wherein said open cells are substantially completely filled with said recurable cellular material.

4. A process of forming a composite polyimide foam-containing article which comprises:
   (i) exposing cured polyimide foam to an atmosphere of steam at an elevated pressure so that said foam is converted into a body of non-flexible, non-resilient, recurable cellular material;

(ii) pressing into said body of non-flexible, non-resilient, recurable cellular material a structure having a plurality of walls defining a plurality of laterally disposed open cells so that said open cells are at least partially filled with said recurable cellular material; and (iii) heating said recurable cellular material to cause it to cure while contained within said cells to form said composite polyimide foam-containing article.

5. A process according to claim 4 wherein the structure used in step (ii) is a honeycomb structure.

6. A process according to claim 50 wherein said open cells are substantially completely filled with said recurable cellular material.

7. A process according to claim 1 wherein the structure used in step (ii) is a resin-coated honeycomb structure.

8. A process according to claim 1 wherein the structure used in step (ii) is a phenolic resin-coated paperboard honeycomb structure.

9. A process according to claim 1 wherein the cured polyomide foam used in step (i) is composed of a polyimide of at least one aromatic tetracarboxylic acid or derivative thereof and at least one aromatic or heterocyclic primary diamine.

10. A process according to claim 1 wherein the cured polyimide foam used in step (i) is composed of a polyimide of benzophenone tetracarboxylic acid or derivative thereof, 4,4'-methylenedianiline and at least one diaminopyridine.

11. A process according to claim 1 wherein the cured polyimide foam used in step (i) is composed of a polyimide produced from a lower alkyl ester of benzophenone tetracarboxylic acid, 4,4'-methylenedianiline and 2,6-diaminopyridine in a mole ratio of approximately 1:0.7:0.3, respectively.

12. A process according to claim 1, wherein the recited steps are conducted such that tensile strength properties of recured cellular material are similar to tensile strength properties of said cured polyimide foam.

13. A process according to claim 1, wherein the recited steps are conducted such that the glass transition temperature of untreated polyimide foam is reduced by application of steam at an elevated pressure to a predetermined range, and said application of steam at an elevated pressure is thereupon discontinued.

14. A process according to Claim 1 wherein the cured polyimide foam that is steam treated in (i) is composed of a polyimide of benzophenone tetracarboxylic acid or derivative thereof and at least one aromatic or heterocyclic primary diamine, or a combination of at least one aromatic and at least one heterocyclic primary diamine.

15. A process according to Claim 14 wherein said cured polyimide foam is composed of a polyimide of benzophenone tetracarboxylic acid dianhydride and at least one aromatic or heterocyclic primary diamine or a combination of at least one aromatic and at least one heterocyclic primary diamine.

16. A process according to Claim 15 wherein said cured polyimide foam is composed of a polyimide of benzophenone tetracarboxylic acid dianhydride and a combination of at least one aromatic and at least one heterocyclic primary diamine.

17. A process according to Claim 15 wherein said cured polyimide foam is composed of a polyimide of benzophenone tetracarboxylic acid dianhydride and a combination of 4,4'-methylenedianiline and 2,6-diaminopyridine.

18. A process according to Claim 17 wherein the diamines of said cured polyimide foam also include a small proportion of primary amino-terminated butadiene-acrylonitrile copolymer.

19. A process according to Claim 17 wherein the diamines of said cured polyimide foam also include a small proportion of 1,6-diaminohexane.

20. A process according to Claim 1 wherein laminating material is applied to the filled cellular structure to cover at least one end portion of the filled cells therein.

21. A process according to Claim 20 wherein the laminating material is flame resistant.

22. A process according to Claim 20 wherein the laminating material is applied to the filled cellular structure before the recurable cellular material in the cells is cured therein to polyimide foam.

23. A process according to Claim 22 wherein the laminating material is flame resistant.

24. A process according to Claim 22 wherein laminating material is applied to both end portions of the filled cells of the filled cellular structure.

25. A process according to Claim 22 wherein laminating material is applied to only one end portion of the filled cells of the filled cellular structure.

26. A process according to Claim 22 wherein the laminating material is flame resistant and is applied to both end portions of the filled cells of the filled cellular structure.

27. A process according to Claim 22 wherein the laminating material is flame resistant and is applied to only one end portion of the filled cells of the filled cellular structure.

28. A process according to claim 20 wherein the laminating material is applied to the filled cellular structure after the recurable cellular material in the cells is cured therein to polyimide foam.

29. A process according to Claim 28 wherein the laminating material is flame resistant.

30. A process according to Claim 28 wherein laminating material is applied to both end portions of the filled cells of the filled cellular structure.

31. A process according to Claim 28 wherein laminating material is applied to only one end portion of the filled cells of the filled cellular structure.

32. A process according to Claim 28 wherein the laminating material is flame resistant and is applied to both end portions of the filled cells of the filled cellular structure.

33. A process according to Claim 28 wherein the laminating material is flame resistant and is applied to only one end portion of the filled cells of the filled cellular structure.

* * * * *

UNITED STATES PATENT AND TRADEMARK OFFICE
CERTIFICATE OF CORRECTION

PATENT NO. : 4,964,936
DATED : October 23, 1990
INVENTOR(S) : Gregory A. Ferro

It is certified that error appears in the above-identified patent and that said Letters Patent is hereby corrected as shown below:

Column 17, line 14, reads "according to Claim 50" and should read -- according to claim 4 --.

Column 17, line 24, reads "polyomide foam" and should read -- polyimide foam --.

Signed and Sealed this

First Day of September, 1992

Attest:

DOUGLAS B. COMER

Attesting Officer

Acting Commissioner of Patents and Trademarks